(12) United States Patent
Jensen

(10) Patent No.: US 12,316,609 B2
(45) Date of Patent: May 27, 2025

(54) ACCESSING CLOUD ENVIRONMENT WITH ZERO TRUST NETWORK ACCESS

(71) Applicant: Charter Communications Operating, LLC, St. Louis, MO (US)

(72) Inventor: Steven Jensen, Conifer, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 448 days.

(21) Appl. No.: 17/547,903

(22) Filed: Dec. 10, 2021

(65) Prior Publication Data

US 2023/0188505 A1 Jun. 15, 2023

(51) Int. Cl.
*H04L 9/40* (2022.01)
(52) U.S. Cl.
CPC ........ *H04L 63/029* (2013.01); *H04L 63/0236* (2013.01); *H04L 63/0876* (2013.01); *H04L 63/107* (2013.01); *H04L 63/166* (2013.01)
(58) Field of Classification Search
None
See application file for complete search history.

(56) References Cited

U.S. PATENT DOCUMENTS

| | | | | |
|---|---|---|---|---|
| 2011/0314532 | A1* | 12/2011 | Austin | H04L 63/0892 726/8 |
| 2020/0175449 | A1* | 6/2020 | Lehmann | H04L 63/0807 |
| 2020/0228540 | A1* | 7/2020 | Hinkle | H04L 63/20 |
| 2021/0336944 | A1* | 10/2021 | Brinckman | H04L 67/306 |

FOREIGN PATENT DOCUMENTS

CN 107205026 A * 9/2017 ......... H04L 61/2521

OTHER PUBLICATIONS

Author Unknown, "Amazon.com: HTTPS VPN Secure WiFi USB Dongle to Bypass Great Firewall, Designed for Dummy," VPNeveryone, available as early as Sep. 2021 from https://www.amazon.com/Secure-Dongle-Bypass-Firewall-Designed/dp/B07LFKH43D, 6 pages.
Steinberg, J., "These Tiny Devices Help Make You Secure and Anonymous on the Internet," Inc.com, Feb. 23, 2016, https://www.inc.com/joseph-steinberg/these-tiny-devices-help-make-you-secure-and-anonymous-on-the-internet.html, 9 pages.

* cited by examiner

*Primary Examiner* — Sanchit K Sarker
(74) *Attorney, Agent, or Firm* — Dority & Manning, P.A.

(57) ABSTRACT

Disclosed herein are embodiments that provide for accessing a cloud environment with Zero Trust Network Access (ZTNA). In particular, the embodiments provide managing communications via an identity broker through a secure tunnel between at least one network device and a cloud environment via an access device. The access device is preconfigured to contact the identity broker to establish the secure tunnel. At least one policy may then be applied to the at least one network device via the access device. In such a configuration, the at least one network device, such as a legacy device or a plurality of network devices, does not require a software client to communicate directly with the identity broker.

18 Claims, 6 Drawing Sheets

ACCESSING CLOUD ENVIRONMENT WITH ZERO TRUST NETWORK ACCESS

BACKGROUND

A Secure Access Service Edge (SASE) is a cloud service model to deliver networking and network security services, such as Zero Trust Network Access (ZTNA). ZTNA is a network architecture that maintains a boundary around one or more applications based on identity and/or context. Typically, network devices communicate with an identity broker to access a cloud environment utilizing ZTNA.

SUMMARY

The embodiments disclosed herein provide for accessing a cloud environment with Zero Trust Network Access (ZTNA). In particular, the embodiments provide managing communications via an identity broker through a secure tunnel between at least one network device and a cloud environment via an access device. The access device is preconfigured to contact the identity broker to establish the secure tunnel. At least one policy may then be applied to the at least one network device via the access device. In such a configuration, at least one network device, such as a legacy device or a plurality of network devices, does not require a software client to communicate directly with the identity broker.

In one embodiment, a method is provided. The method includes obtaining, by a computing device comprising a processor device, a network address over an IP network. An identity broker is configured to manage access to a cloud environment. The method further includes sending, by the computing device, an access request toward the identity broker over the IP network. The access request includes the network address and a universally unique identifier (UUID) associated with the computing device. The method further includes establishing, by the computing device, a secure tunnel with the identity broker. The method further includes forwarding, by the computing device, communications between at least one network device and the identity broker through the secure tunnel.

In another embodiment, an access device is provided. The access device includes a network interface configured to communicate over a network and a processor device. The processor device is configured to obtain, via the network interface, an network address over an IP network. An identity broker is configured to manage access to a cloud environment. The processor device is further configured to send, via the network interface, an access request toward the identity broker over the IP network. The access request includes the network address and a UUID associated with a computing device. The processor device is further configured to establish, by the computing device, a secure tunnel with the identity broker. The processor device is further configured to forward, by the computing device, communications between a network device and the identity broker through the secure tunnel.

In another embodiment, a method is provided. The method includes receiving, by a computing system comprising one or more processor devices, an access request from an access device over an IP network. The access request includes a network address and a UUID associated with the access device. The method further includes retrieving, by the computing system, an identity profile based on the UUID. The method further includes determining, by the computing system, access to a cloud environment based on the identity profile. The method further includes establishing, by the computing system, a secure tunnel with the access device to access the cloud environment. The method further includes managing, by the computing system, communications through the secure tunnel between at least one network device and the cloud environment via the access device.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

A Secure Access Service Edge (SASE) is a cloud service model to deliver networking and network security services, such as Zero Trust Network Access (ZTNA). ZTNA is a network architecture that maintains a boundary around one or more applications based on identity and/or context. Typically, network devices communicate with an identity broker to access a cloud environment utilizing ZTNA.

The embodiments disclosed herein provide for accessing a cloud environment with ZTNA. In particular, the embodiments provide managing communications via an identity broker through a secure tunnel between at least one network device and a cloud environment via an access device. The access device is preconfigured to contact the identity broker to establish the secure tunnel. At least one policy may then be applied to the at least one network device via the access device. In such a configuration, the at least one network device, such as a legacy device or a plurality of network devices, does not require a software client to communicate directly with the identity broker.

Figure 1:
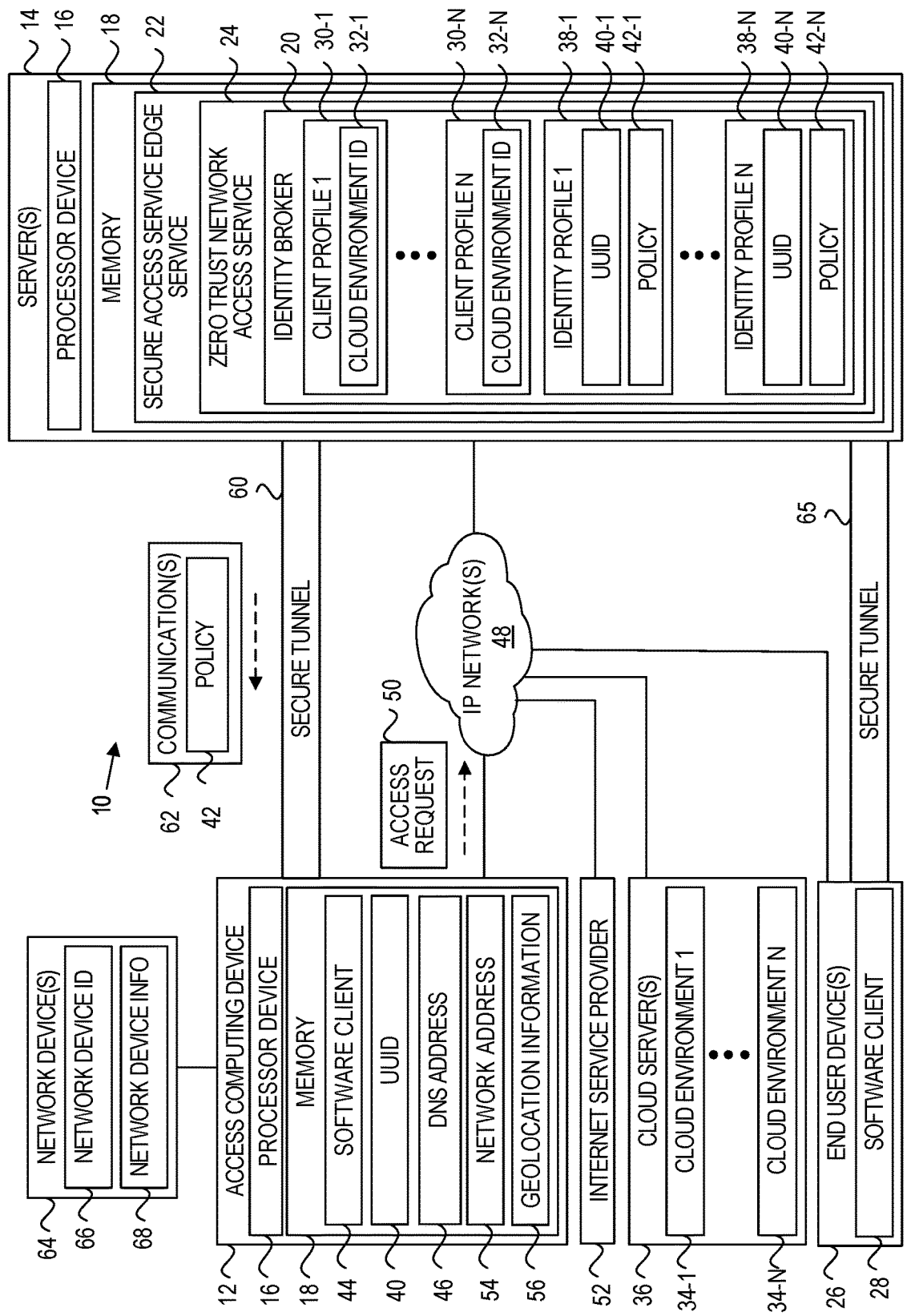
FIG. 1 is a block diagram of a system for accessing a cloud environment with Zero Trust Network Access (ZTNA), illustrating certain aspects of various embodiments disclosed herein.

FIG. 1 is a block diagram of a system for accessing a cloud environment with ZTNA, illustrating certain aspects of various embodiments disclosed herein. The system 10 includes an access computing device 12 and a server 14, each with a processor device 16 and a memory 18 coupled to the processor device 16. Although only the access computing device 12 and the server 14 are illustrated with a processor device 16 and a memory 18, any component may include a processor device 16 (or processor device set) and/or a memory 18 (or memory set).

As explained in more detail below, the server 14 includes an identity broker 20. As the identity broker 20 is a component of the server 14, functionality implemented by the identity broker 20 may be generally attributed to the server 14. Moreover, in examples where the identity broker 20 comprises software instructions that program the processor device 16 to carry out functionality discussed herein, functionality implemented by the identity broker 20 may be attributed herein to the processor device 16.

It is further noted that while the identity broker 20 is shown as a single component, in other implementations, the identity broker 20 may be implemented in a plurality of components. Finally, it is noted that while, for purposes of illustration and simplicity, the embodiments are illustrated as being implemented by a single processor device on a single computing device, in other environments, such as a distributed and/or clustered environment, and where the identity broker 20 is implemented in multiple components, the identity broker 20 may be implemented on a computer system that includes a plurality of processor devices of a plurality of different computing devices. Thus, irrespective of the implementation, the embodiments may be implemented on a computer system that includes one or more processor devices of one or more computing devices. It is further noted that the above may also similarly apply to other components discussed herein.

The server 14 includes a SASE service 22. SASE is a network architecture for network access and network security. SASE provides virtual private networks (VPN), software-defined wide area networks (SD-WAN), and cloud security functions. A VPN extends a private network across a public network by establishing a virtual point-to-point connection, such as with a tunneling protocol. A WAN is a connection between local area networks (LAN) separated by a substantial distance. An SD-WAN provides centralized control and often resides in a software as a service (SaaS), which is a software licensing and delivery model in which software is centrally located and licensed on a subscription basis. Accordingly, control of an SD-WAN is separate from the hardware, thereby facilitating network management. The SASE service 22 may provide dynamic host configuration protocol (DHCP), identity management, next generation firewall (NGFW), access control, virus scan, botnet, threat detection, machine learning, artificial intelligence, or the like. Cloud security functions may include secure web gateways, security brokers, firewalls, ZTNA, or the like.

The SASE service 22 includes a ZTNA service 24, among other features and services. ZTNA provides secure remote access to a client's or organization's applications, data, and services based on access control policies. Where a VPN provides access to an entire network, ZTNA only grants access to specific services or applications. In particular, ZTNA provides access to applications or resources after the user has been authenticated. After authentication, ZTNA provides access to the specific service or application through a secure tunnel. Such tunneling protocols may use IP Security (IPSEC), Transport Layer Security (TLS), and/or Data Transport Layer Security (DTLS), or the like.

Implementation of ZTNA may be endpoint-initiated or service-initiated. In an endpoint-initiated ZTNA, the end user initiates access to an application, similar to software-defined perimeters (SDP). In such a configuration, a software client 28 is typically installed on an end user device 26 to communicate with the ZTNA service 24, which authenticates the end user device 26 and provides connectivity to the specific application that the end user is authorized to access. In a service-initiated ZTNA, a ZTNA broker initiates a connection between a user and an application. The ZTNA service 24 establishes an outbound connection from a requested application to the ZTNA service 24. Once the end user is authenticated, traffic passes through the ZTNA service 24, which isolates the application from direct access via proxy.

The ZTNA service 24 includes an identity broker 20 to authenticate an identity of a user or device. The identity broker 20 may include one or more client profiles 30-1-30-N (referred to generally as client profile 30). Each client profile 30 may be associated with a cloud environment ID 32-1-32-N (referred to generally as cloud environment ID 32). Each cloud environment ID 32 is associated with a different cloud environment 34-1-34-N (referred to generally as cloud environment 34) hosted on one or more cloud servers 36.

The ZTNA service 24 further includes one or more identity profiles 38-1-38-N (referred to generally as identity profile 38). Each identity profile 38 may include one or more universally unique identifier (UUID) 40-1-40-N (referred to generally as a UUID 40). Further, each identity profile 38 also includes one or more policies 42-1-42-N (referred to generally as policy 42). The policy 42 for any particular end user or device may depend upon on a user identity, a functional role, device profiling, network use, geographic location, or the like. For example, a client profile 30 may include several identity profiles 38 associated therewith. The client profile 30 indicates which policies to apply to particular end users and/or circumstances, or the like. In this way, an organization or enterprise can control access to certain applications or services.

The access computing device 12 is preconfigured to connect with the identity broker 20 of the ZTNA service 24 of the SASE service 22. The access computing device 12 may be preconfigured with a software client 44, a UUID 40, and/or a DNS address 46. For example, the UUID 40 may be auto discovered or pre-provisioned in the access computing device 12 and/or the identity broker 20. In this way, an identity profile 38 associated with a client profile 30 is set up before the access computing device 12 contacts the identity broker 20. When the access computing device 12 is connected to and gains access (directly or indirectly) to an internet protocol (IP) network 48, the access computing device 12 sends an access request 50 to the identity broker 20 over the IP network 48 using the DNS address 46. In certain embodiments, the access computing device 12 is dynamic host configuration protocol (DHCP) or static IP enabled. In certain embodiments, an internet service provider (ISP) 52 provides the access computing device 12 with a network address 54, such as IPv4, IPv6, or a Local Area Network (LAN), or the like. The access computing device 12 may receive or be associated with the network address 54 either directly from the ISP 52 or an intervening LAN device. In certain embodiments, the access computing device 12 is programmed with a static address via command line interface (CLI) or graphic user interface (GUI). In certain embodiments, the access computing device 12 includes geolocation information 56, such as from a global positioning satellite (GPS) receiver.

Upon receipt of the access request 50 by the identity broker 20, the identity broker 20 uses the UUID 40 to authenticate the access computing device 12. If the UUID 40 is not registered with the identity broker 20, the identity broker 20 may deny access of the access computing device 12 to any cloud environment 34. Once authenticated, the identity broker 20 may apply an initial network posture, such as access to DHCP servers, DNS servers, identity management, NGFW, access control, traffic policy, or the like. Further, the identity broker 20 establishes a secure tunnel 60 with the access computing device 12 using a tunneling protocol, such as IPSEC, TLS, and/or DTLS. Accordingly, any further communication 62 between the ZTNA service and the access computing device 12 is over the secure tunnel 60. For example, the ZTNA service 24 may forward a policy 42 to the access computing device 12. In certain embodiments, the policy 42 is based on the UUID 40 and/or the geolocation information 56 of the access computing device 12.

A network device 64 is in direct communication with the access computing device 12. The network device 64 may include a network device ID 66 and/or network device information 68. The network device ID 66 may uniquely identify the network device 64. The network device information 68 may identify the type of network device 64. The network device 64 may communicate with the ZTNA service 24 through the secure tunnel 60 of the access computing device 12. Accordingly, the network device 64 does not itself require a software client 44 and may be devoid of one, but may still communicate with the ZTNA service 24.

The ZTNA service 24 may include an identity profile 38 associated with the network device 64, such as by the network device ID 66. Further, the policy 42 associated with the network device 64 may depend on the access computing device 12, the geolocation information 56, and/or the network device information 68. In such a configuration, an end user device 26 may be in communication with the ZTNA service 24 through a secure tunnel 65. The end user device 26 may communicate with the network device 64 over secure tunnels 60, 65 through the identity broker 20 of the server 14 and the secure tunnel 60 of the access computing device 12. The identity broker 20 and/or the access computing device 12 may manage applying the policy 42 to the access computing device 12 or to the network device 64.

Such a configuration may be advantageous for legacy devices that are not configured for ZTNA communication and may not be registered with the ZTNA service 24. Such legacy devices (e.g., printer, thermostat) may not be provided with or even be able to include a software client 44 to connect to the ZTNA service 24. Further, such a configuration may be advantageous for access points that may be in communication with a plurality of transient network devices 64. For example, the access computing device 12 may be an access point, such as in a school, office, or the like. The access computing device 12 may authorize access of the various network devices 64 to the ZTNA service 24, where the ZTNA service 24 may apply a policy 42 depending on the type of network device 64 and/or the end user of the network device 64.

Figure 2A:
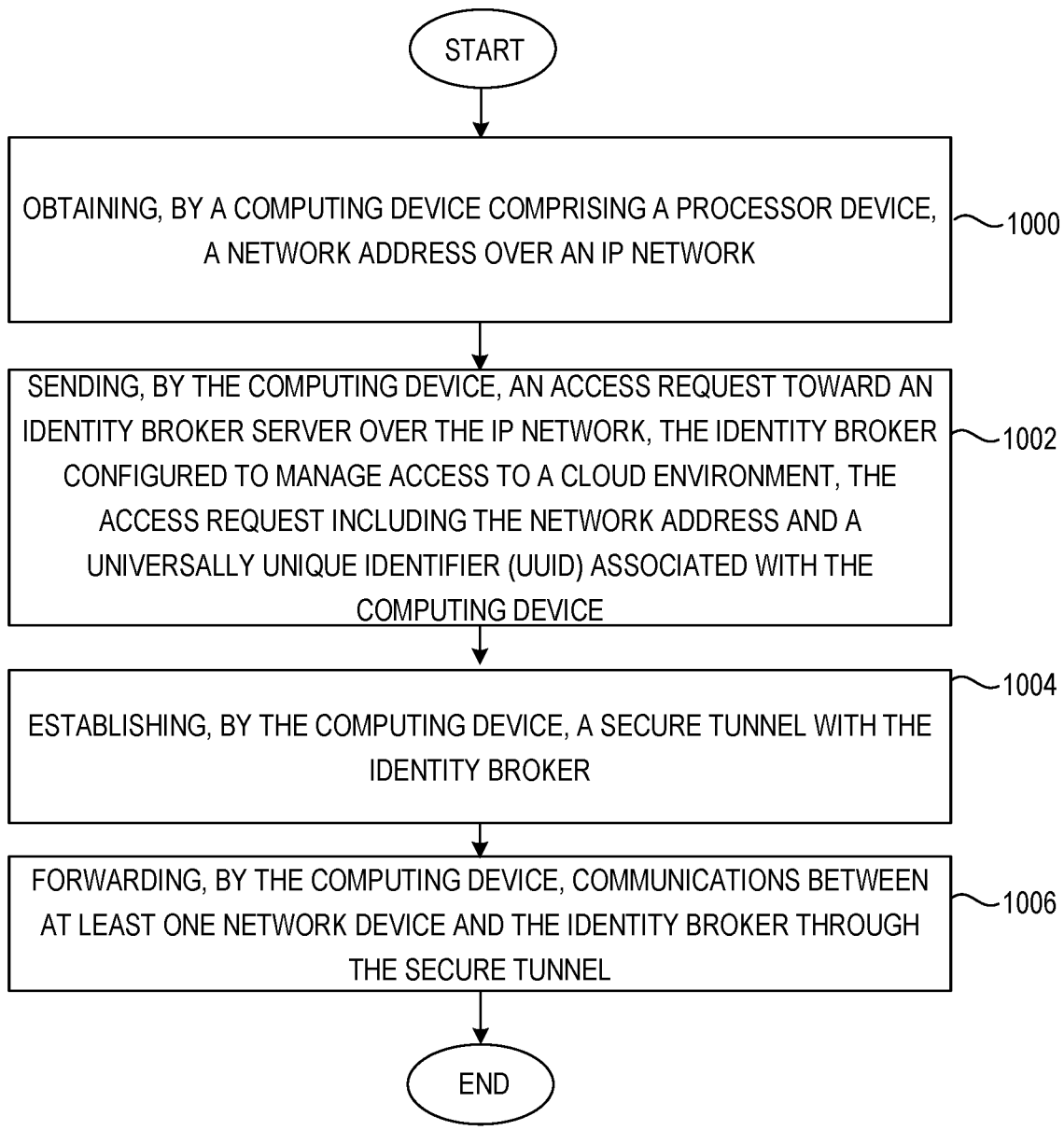
FIG. 2A is a flowchart illustrating processing steps for an access device accessing a cloud environment.

FIG. 2A is a flowchart illustrating processing steps for an access computing device 12 accessing a cloud environment 34. The computing device 12 comprising a processor device 16 obtains a network address 54 over an IP network 48 (1000). The computing device 12 sends an access request 50 toward an identity broker 20 over the IP network 48 (1002). The identity broker 20 is configured to manage access to a cloud environment 34. The access request 50 includes the network address 54 and a UUID 40 associated with the computing device 12. The computing device establishes a secure tunnel 60 with the identity broker 20 (1004). The computing device 12 forwards communications 62 between at least one network device 64 and the identity broker 20 through the secure tunnel 60 (1006).

Figure 2B:
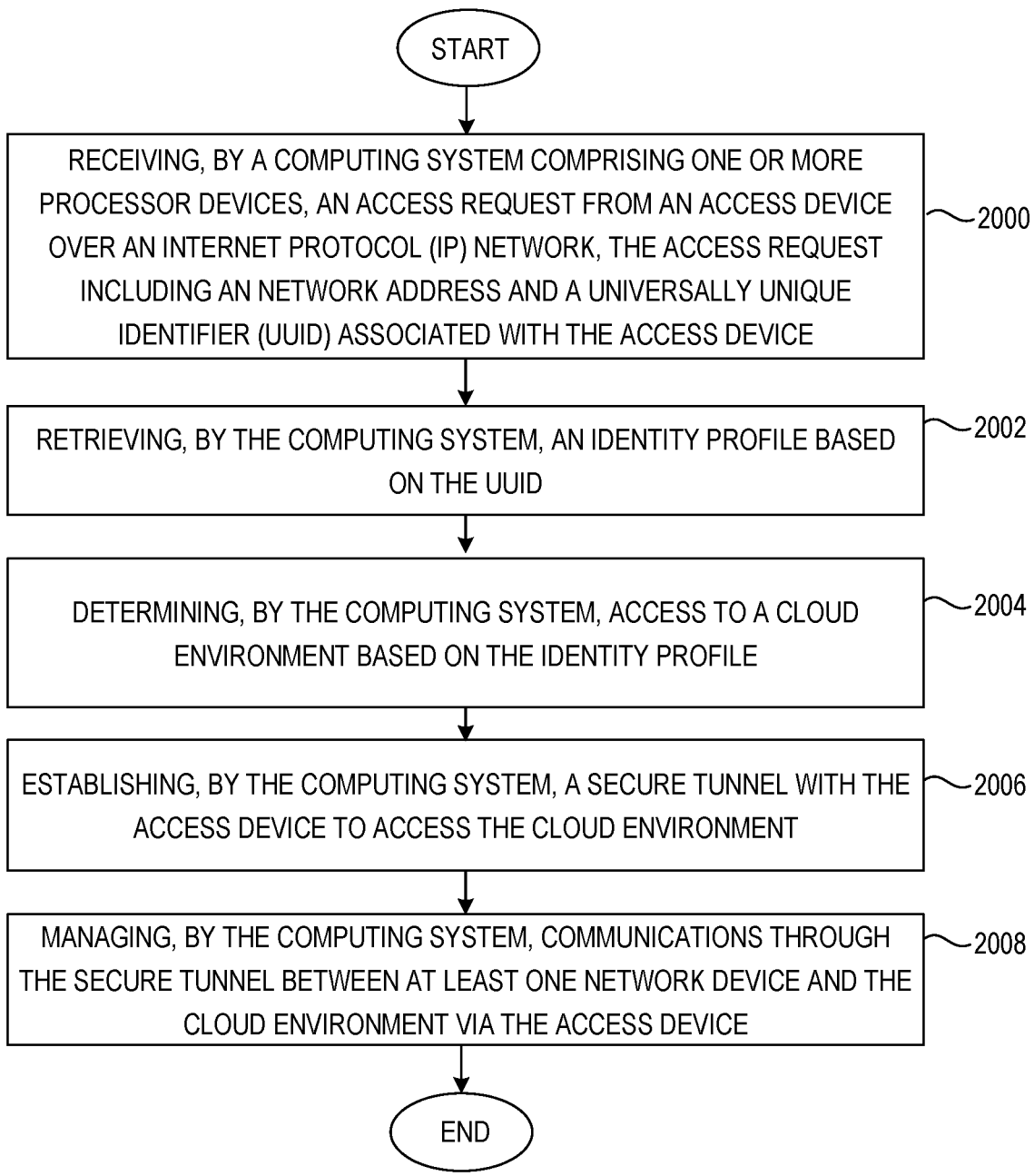
FIG. 2B is a flowchart illustrating processing steps for an identity broker managing access to a cloud environment.

FIG. 2B is a flowchart illustrating processing steps for an identity broker 20 managing access to a cloud environment 34. The computing system 14 comprising one or more processor devices 16 receives an access request 50 from an access computing device 12 over an IP network 48 (2000). The access request 50 includes a network address 54 and a UUID 40 associated with the access computing device 12. The computing system 14 retrieves an identity profile 38 based on the UUID 40 (2002). The computing system 14 determines access to a cloud environment 34 based on the identity profile 38 (2004). The computing system 14 establishes a secure tunnel 60 with the access computing device 12 to access the cloud environment 34 (2006). The computing system 14 manages communications through the secure tunnel 60 between at least one network device 64 and the cloud environment 34 via the access computing device 12 (2008).

Figure 3:
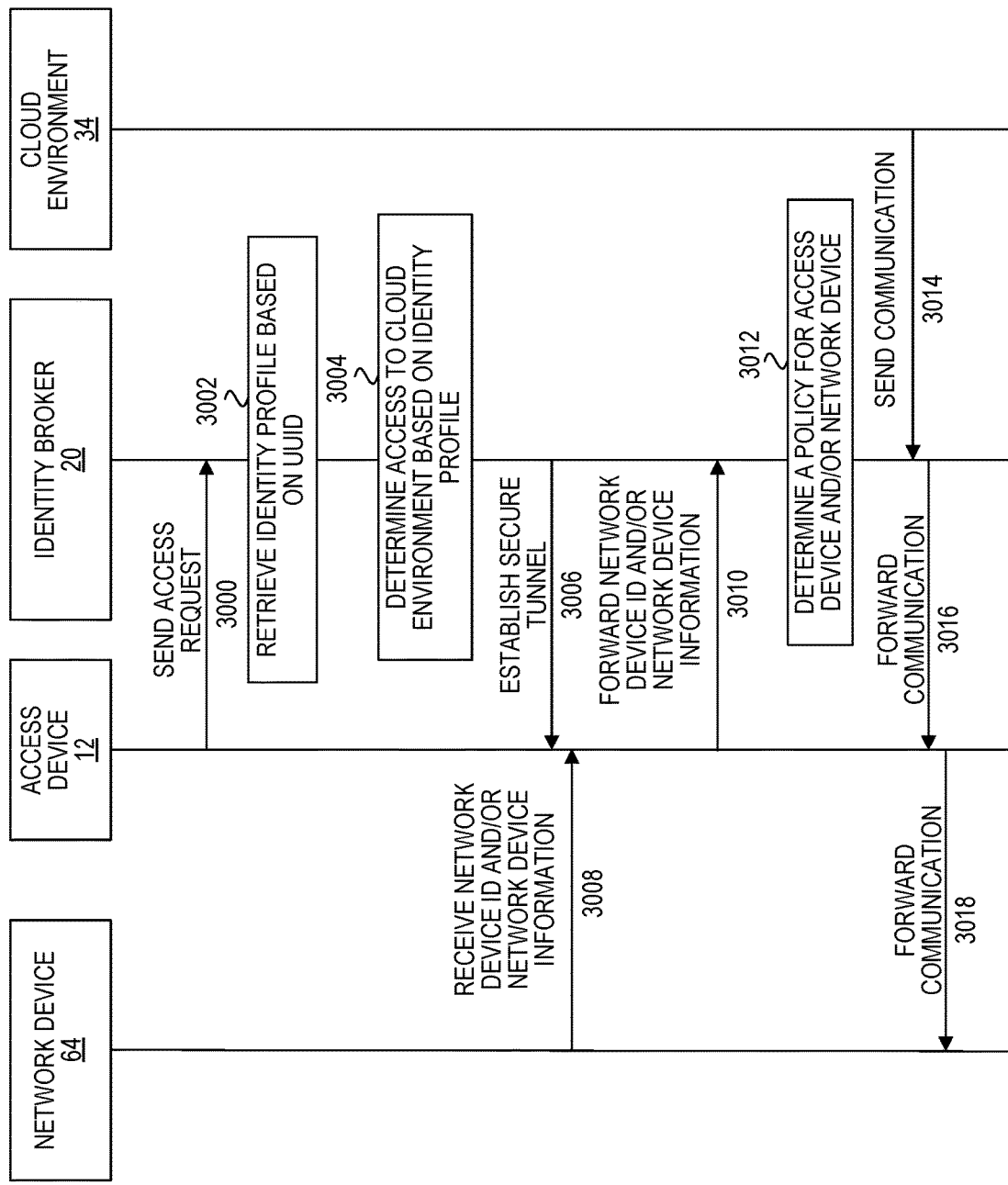
FIG. 3 is a message sequence diagram illustrating example messages communicated between and actions taken by several of the elements illustrated in FIG. 1, according to one embodiment.

FIG. 3 is a message sequence diagram illustrating example messages communicated between and actions taken by several of the elements illustrated in FIG. 1, according to one embodiment. The access computing device 12 sends an access request 50 to an identity broker 20 over an IP network 48 (3000). The access request 50 includes a DNS address 46 associated with the identity broker 20 and a UUID 40 associated with the access computing device 12. The identity broker 20 receives the access request 50 and retrieves an identity profile 38 based on the UUID 40 (3002). The identity broker 20 determines access to a cloud environment 34 based on the identity profile 38 (3004). The identity broker 20 establishes a secure tunnel 60 with the access computing device 12 to access the cloud environment 34 (3006). The access computing device 12 receives a network device ID 66 and/or network device information 68 from a network device 64 (3008) and forwards such data to the identity broker 20 (3010). The identity broker 20 determines a policy 42 for the access computing device 12 and/or the network device 64 (3012). The identity broker 20 and/or the access computing device 12 applies the policy 42 to manage communication 62 through the secure tunnel 60 between the network device 64 and the cloud environment 34 via the access computing device 12 and the identity broker 20 (3014-3018).

Figure 4A:
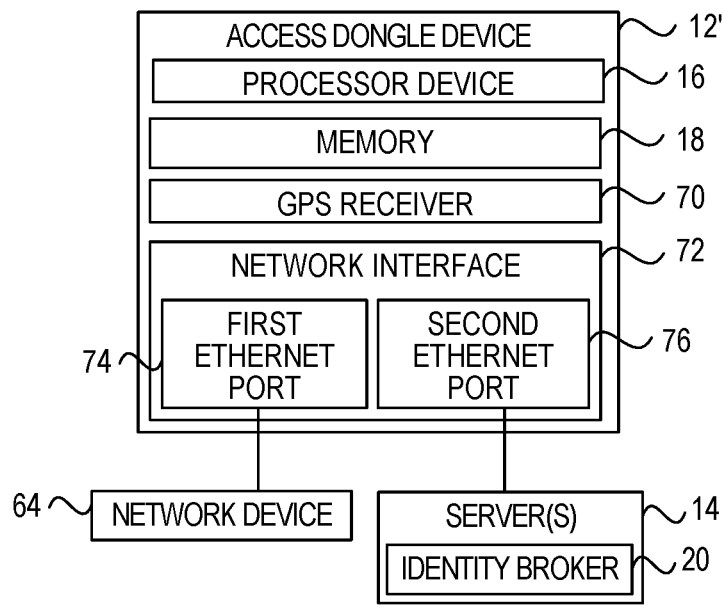
FIG. 4A is a block diagram of an embodiment of the system of FIG. 1 using an access dongle device.

FIG. 4A is a block diagram of an embodiment of the system of FIG. 1 using an access dongle device 12'. In certain embodiments, the access dongle device 12' includes a GPS receiver 70. Further, the access dongle device 12' includes a network interface 72 including a first ethernet port 74 and a second ethernet port 76. The first ethernet port 74 is connected to a network device 64, such as a printer, thermostat, or the like. The second ethernet port 76 is in communication with an identity broker 20 of a server 14, such as over an IP network 48. In such a configuration, the access dongle device 12' may be powered by power over ethernet. Of course, other configurations may be used, such that the access dongle device 12' is plugged into a power socket. In certain embodiments, the access dongle device 12' is connected to more than one network device 64, as in a hub.

Figure 4B:
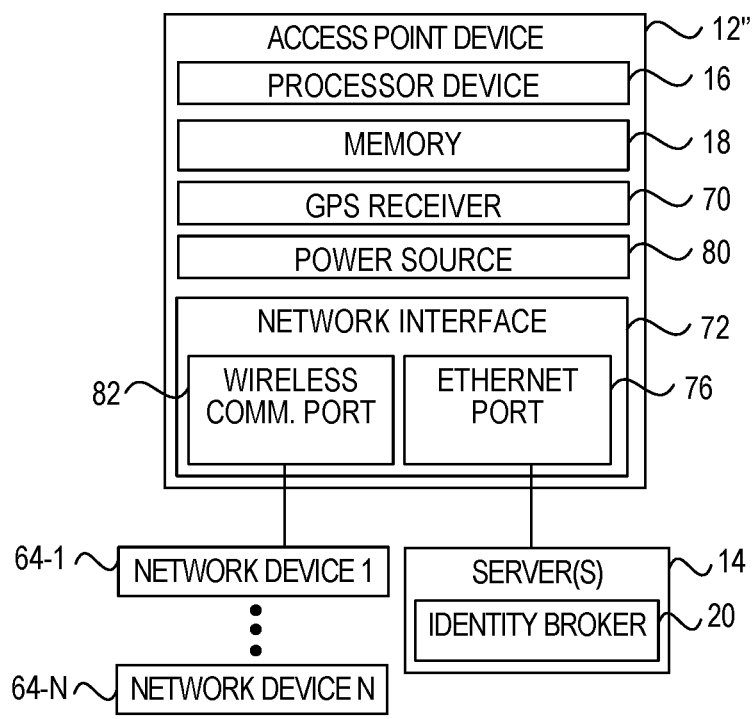
FIG. 4B is a block diagram of another embodiment of the system of FIG. 1 using an access point device.

FIG. 4B is a block diagram of another embodiment of the system of FIG. 1 using an access point device 12". In certain embodiments, the access point device 12" includes a GPS receiver 70. In certain embodiments, the access point device 12" includes a power source 80, such as a power socket. The access point device 12" includes a network interface 72 including an ethernet port 76 and a wireless communication port 72. The ethernet port 76 is in communication with an identity broker 20 of a server 14. The wireless communication port 82 is in communication with one or more network devices 64-1-64-N.

Such a configuration removes high-cost client premise equipment, simplifies identity management, applies next generation firewall (NGFW) policies to network packets, or the like. The access point device 12" obviates the need for traditional edge firewalls by moving such intelligence to the cloud. The access point device 12" manages traditional NGFW policy, scale on demand, applies AI/ML to traffic workloads, enables rapid device deployment, and simplifies on premise solutions. The access point device 12" attaches to an IP network 48 and activates via zero touch provisioning (ZTP).

In certain embodiments, the identity broker 20 may apply a policy 42 depending on the proximity of the network device 64 to the access computing device 12, 12', 12". For example, the identity broker 20 may determine that the access computing device 12, 12', 12" is in direct communication with multiple network devices 64-1-64-N, thereby providing access to each other. As a more specific example, a first network device 64-1 embodied as a user laptop may be in communication with an access point device 12". A second network device 64-2 embodied as a printer may also be in communication with the access point device 12". Accordingly, the policy 42 may determine that the first network device 64-1 should have access to the second network device 64-2 due to the proximity of the two to each other.

In another example, the identity broker 20 may determine that a first network device 64-1 is a teacher laptop and a second network device 64-2 is a student laptop. Accordingly, even though both laptops may be accessing the same access point device 12", the identity broker 20 may apply a first policy 42-1 to the teacher laptop and a second policy 42-2 to the student laptop.

Figure 5:
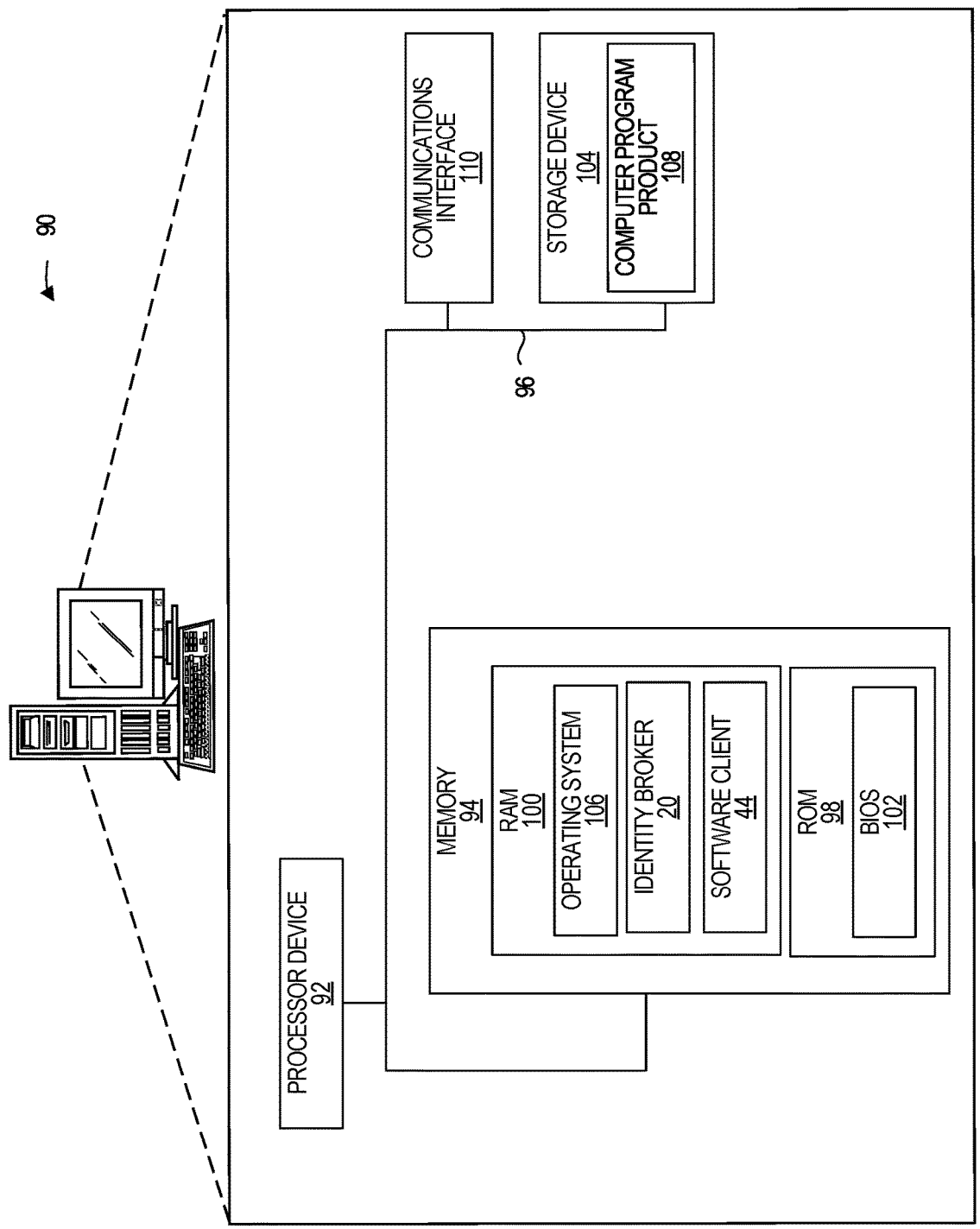
FIG. 5 is a block diagram of a computing device suitable for implementing one or more of the processing devices disclosed herein, according to one embodiment.

FIG. 5 is a block diagram of a computing device 90 containing components suitable for implementing any of the processing devices disclosed herein. The computing device 90 includes a processor device 92, a system memory 94, and a system bus 96. The system bus 96 provides an interface for system components including, but not limited to, the system memory 94 and the processor device 92. The processor device 92 can be any commercially available or proprietary processor.

The system bus 96 may be any of several types of bus structures that may further interconnect to a memory bus (with or without a memory controller), a peripheral bus, and/or a local bus using any of a variety of commercially available bus architectures. The system memory 94 may include non-volatile memory 98 (e.g., read-only memory (ROM), erasable programmable read-only memory (EPROM), ternary content-addressable memory (TCAM), electrically erasable programmable read-only memory (EEPROM), or the like), and volatile memory 100 (e.g., random-access memory (RAM)). A basic input/output system (BIOS) 102 may be stored in the non-volatile memory 98 and can include the basic routines that help transfer information between elements within the computing device 90. The volatile memory 100 may also include a high-speed RAM, such as static RAM, for caching data.

The computing device 90 may further include or be coupled to a non-transitory computer-readable storage medium such as a storage device 104, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 104 and other drives associated with computer-readable media and computer-usable media may provide non-volatile storage of data, data structures, computer-executable instructions, and the like.

A number of modules can be stored in the storage device 104 and in the volatile memory 100, including an operating system 106 and one or more program modules, which may implement the functionality described herein in whole or in part. All or a portion of the examples may be implemented as a computer program product 108 stored on a transitory or non-transitory computer-usable or computer-readable storage medium, such as the storage device 104, which includes complex programming instructions, such as complex computer-readable program code, to cause the processor device 92 to carry out the steps described herein. Thus, the computer-readable program code can comprise software instructions for implementing the functionality of the examples described herein when executed on the processor device 92. The processor device 92, in conjunction with the network manager in the volatile memory 100, may serve as a controller or control system for the computing device 90 that is to implement the functionality described herein.

The computing device 90 may also include one or more communication interfaces 110, depending on the particular functionality of the computing device 90. The communication interfaces 110 may comprise one or more wired Ethernet transceivers, wireless transceivers, fiber, satellite, and/or coaxial interfaces by way of non-limiting examples.

Those skilled in the art will recognize improvements and modifications to the preferred embodiments of the disclosure. All such improvements and modifications are considered within the scope of the concepts disclosed herein and the claims that follow.

What is claimed is:

1. A method comprising:
obtaining, by a computing device comprising a processor device communicatively coupled to a network device, an internet protocol (IP) address over an IP network;

sending, by the computing device, an access request toward an identity broker over the IP network to establish a secure tunnel with the identity broker, the identity broker configured to manage access to a cloud environment, the access request including the IP address and a universally unique identifier (UUID) associated with the computing device that has been registered with the identity broker, wherein the UUID corresponds to an identity profile of a plurality of identity profiles used by the identity broker to determine access rights to the cloud environment, and wherein the network device lacks an ability to establish the secure tunnel with the identity broker;

establishing, by the computing device, the secure tunnel with the identity broker using a tunneling protocol; and forwarding, by the computing device over the IP network, communications originating from the network device for the cloud environment to the identity broker through the secure tunnel.

2. The method of claim 1, wherein forwarding, by the computing device, communications originating from the network device to the identity broker through the secure tunnel further comprises:

communicating, over a first ethernet port of the computing device, with the identity broker; and communicating, over a second ethernet port of the computing device, with the network device.

3. The method of claim 1, wherein forwarding, by the computing device, communications originating from the network device to the identity broker through the secure tunnel further comprises:

communicating, over a first ethernet port of the computing device, with the identity broker; and communicating, over a wireless communication port of the computing device, with the network device.

4. The method of claim 3, wherein communicating, over the wireless communication port of the computing device, with the network device further comprises:

communicating, over the wireless communication port of the computing device, with a plurality of network devices.

5. The method of claim 1, wherein the network device is devoid of a software client configured to communicate directly with the identity broker.

6. The method of claim 1, further comprising:

receiving, by the computing device, at least one policy from the identity broker; and applying, by the computing device, the at least one policy to the network device.

7. The method of claim 1, further comprising:

obtaining, by the computing device, geolocation information via a global positioning system (GPS) receiver of the computing device; and sending, by the computing device, the geolocation information toward the identity broker.

8. The method of claim 1, further comprising:

retrieving, from a memory of the computing device, a domain name system (DNS) address associated with the identity broker, the computing device preconfigured with the DNS address.

9. The method of claim 1, wherein establishing, by the computing device, the secure tunnel with the identity broker further comprises:

establishing, by the computing device, the secure tunnel with the identity broker via IP Security (IPSEC), Transport Layer Security (TLS), or Data Transport Layer Security (DTLS).

10. An access device comprising:

a network interface configured to communicate over a network; and a hardware processor device configured to:

obtain, via the network interface, an internet protocol (IP) address over an IP network;

send, via the network interface, an access request toward an identity broker over the IP network to establish a secure tunnel with the identity broker, the identity broker configured to manage access to a cloud environment, the access request including the IP address and a universally unique identifier (UUID) associated with the access device that has been registered with the identity broker, wherein the UUID corresponds to an identity profile of a plurality of identity profiles used by the identity broker to determine access rights to the cloud environment;

establish the secure tunnel with the identity broker using a tunneling protocol; and forward communications for the cloud environment and originating from a network device to which the access device is communicatively coupled to the identity broker through the secure tunnel, wherein the network device lacks an ability to establish the secure tunnel with the identity broker.

11. The access device of claim 10, wherein the network interface comprises:

a first ethernet port configured to communicate with the identity broker; and a second ethernet port configured to communicate with the network device.

12. The access device of claim 10, wherein the network interface comprises:

a first ethernet port configured to communicate with the identity broker; and a wireless communication port configured to wirelessly communicate with the network device.

13. The access device of claim 12, wherein, to communicate, over the wireless communication port of the access device, with the network device, the processor device is further configured to communicate, over the wireless communication port, with a plurality of network devices.

14. The access device of claim 10, further comprising a global positioning (GPS) receiver.

15. The access device of claim 10, wherein the processor device is further configured to:

receive at least one policy from the identity broker; and apply the at least one policy to the network device.

16. The access device of claim 10, wherein the access device further comprises a global positioning system (GPS) receiver, and wherein the processor device is further configured to:

obtain geolocation information via the GPS receiver; and send the geolocation information toward the identity broker.

17. The access device of claim 10, wherein the processor device is further configured to retrieve, from a memory of the access device, a domain name system (DNS) address associated with the identity broker, the access device being preconfigured with the DNS address.

18. The access device of claim 10, wherein, to establish the secure tunnel with the identity broker, the processor device is further configured to establish the secure tunnel with the identity broker via IP Security (IPSEC), Transport Layer Security (TLS), or Data Transport Layer Security (DTLS).

* * * * *